US006450703B1

(12) United States Patent
Shirakawa (10) Patent No.: US 6,450,703 B1
(45) Date of Patent: *Sep. 17, 2002

(54) RECEPTACLE OF OPTICAL CONNECTOR (75) Inventor: Tsuguhito Shirakawa, Shizuoka (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/456,915

(22) Filed: Dec. 7, 1999

(30) Foreign Application Priority Data

Jun. 30, 1999 (JP) .............................. 11-185483

(51) Int. Cl.[7] .................................. G02B 6/36
(52) U.S. Cl. ........................ 385/92; 385/88; 385/89
(58) Field of Search .......................... 385/92, 88, 89; 439/620; 174/50.52; 361/810, 809, 785

(56) References Cited

U.S. PATENT DOCUMENTS 4,737,008 A * 4/1988 Ohyama et al. ............. 385/93
5,224,186 A    6/1993 Kishimoto et al.
5,259,053 A   11/1993 Schaffer et al.
5,475,783 A * 12/1995 Kurashima ................. 385/92
5,633,971 A    5/1997 Kurashima
6,113,280 A *  9/2000 Nagaoka et al. ............. 385/53

FOREIGN PATENT DOCUMENTS

EP    0 009 330 A1    4/1980
EP    0 320 214 A2    6/1989

* cited by examiner

Primary Examiner—Cassandra Spyrou
Assistant Examiner—Alessandro V. Amari
(74) Attorney, Agent, or Firm—Armstrong, Westerman & Hattori (57) ABSTRACT A receptacle with high productivity is provided, wherein rear openings 4 of a connector housing 2 of the receptacle 1 continue to respective terminal led-out portions 22 so that terminals 34 and 35 of a light receiving element module 6 and a luminescence element module 7, respectively, are easily fitted to the connector housing 2 and projecting portions 38, which project into the respective terminal led-out portions 22 near to the respective terminals 34 and 35, are formed on a cap member 8.

8 Claims, 12 Drawing Sheets

RECEPTACLE OF OPTICAL CONNECTOR

BACKGROUND OF THE INVENTION

1. Field of the Invention

The present invention generally relates to a receptacle of an optical connector and more particularly, to a receptacle to be coupled with an optical plug and having a light receiving element module and a luminescence element module in a connector housing thereof.

2. Description of the Related Art

Figure 14:
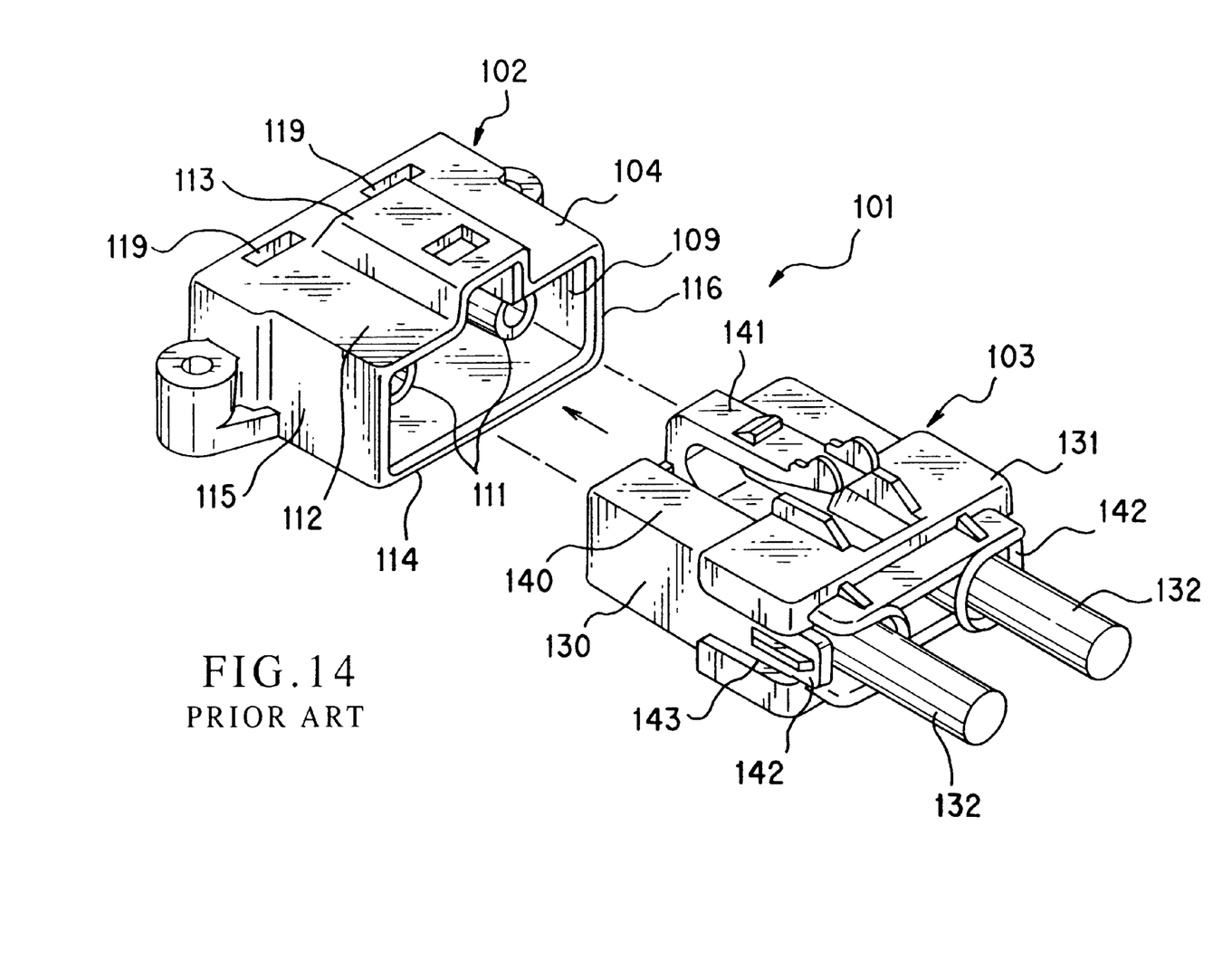
FIG. 14 is an exploded perspective view of a conventional optical connector consisting of a receptacle and an optical plug.

Referring to FIG. 14, a reference character 101 indicates an optical connector which is applied to a multiplex transmission circuit on, for example, a body of a motor vehicle, which optical connector 101 consists of a receptacle 102 and an optical plug 103.

Figure 15:
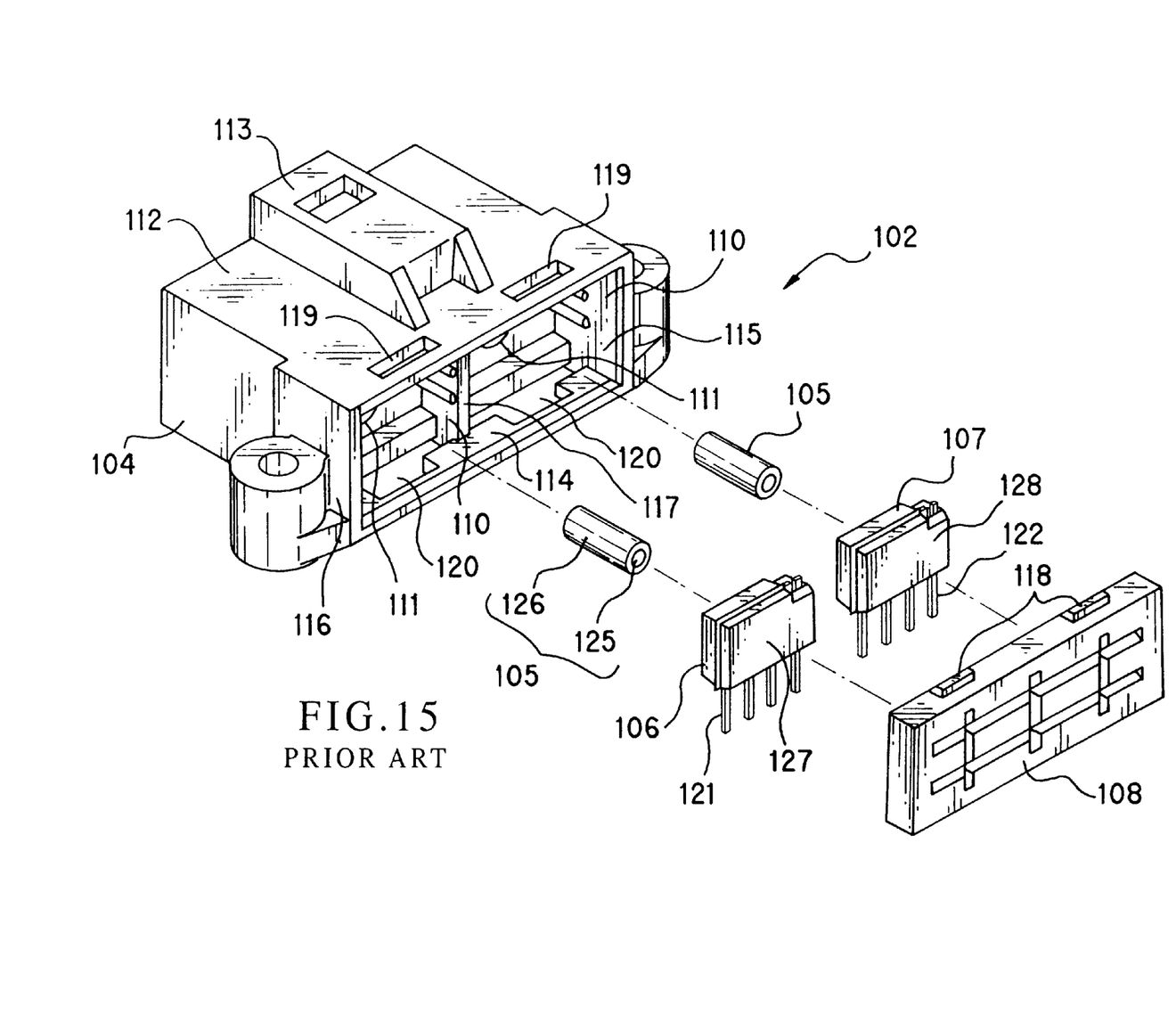
FIG. 15 is an exploded perspective view of the conventional receptacle.

As shown in FIGS. 14 and 15, the receptacle 102 has a connector housing 104 which has front and rear openings. Through the front opening of the connector housing 104 the optical plug 103 is coupled therewith (FIG. 14). And, as shown in FIG. 15, through the rear opening of the connector housing 104, a sleeve member 105, a light receiving element module 106 (an optical element module), a luminescence element module 107 (an optical element module), and a cap member 108 in a rectangular plate-like shape are fitted in turn.

Inside the connector housing 104, a coupling portion 109 to couple with the optical plug 103 (FIG. 14) through the front opening, accommodating chambers 110 to accommodate the light receiving element module 106 and the luminescence element module 107 from the rear opening, and transferring tube portions 111 connecting the coupling portion 109 (FIG. 14) and the accommodating chambers 110 are formed. An optical plug locking portion 113 formed on a top wall 112 of the connector housing 104 engages a locking arm 141 (FIGS. 14 and 16) of the optical plug 103 (FIG. 14). The locking arm 141 will be described later.

The accommodating chambers 110 are surrounded by a top wall 112, a bottom wall 114, right and left walls 115,116, and a partition wall 117, which partition wall 117 stands in the middle of the right and left walls 115,116 and forms the accommodating chamber 110 for the light receiving element module 106 and the chamber 110 the luminescence element module 107.

Engaging portions 119 to engage securing projections 118 (only two are shown) which are formed on top and bottom edge portions of the cap member 108 are formed on the top wall 112 over the accommodating chambers 110. And, terminal led-out portions 120 open on the bottom wall 114 under the accommodating chambers 110.

Terminals 121, 122 of the light receiving element module 106 and the luminescence element module 107, respectively, are put through wide portions of the respective terminal led-out portions 120. And, a pair of securing projections 118 formed on the top edge portion of the cap member 108 engage narrow portions of the respective engaging portions 119.

The pair of securing projections 118, which are on each of the top and bottom edge portions of the cap member 108, engage the engaging portions 119 and the terminal led-out portions 120, respectively, thereby to prevent the cap member 108 from falling off the rear opening.

Figure 16:
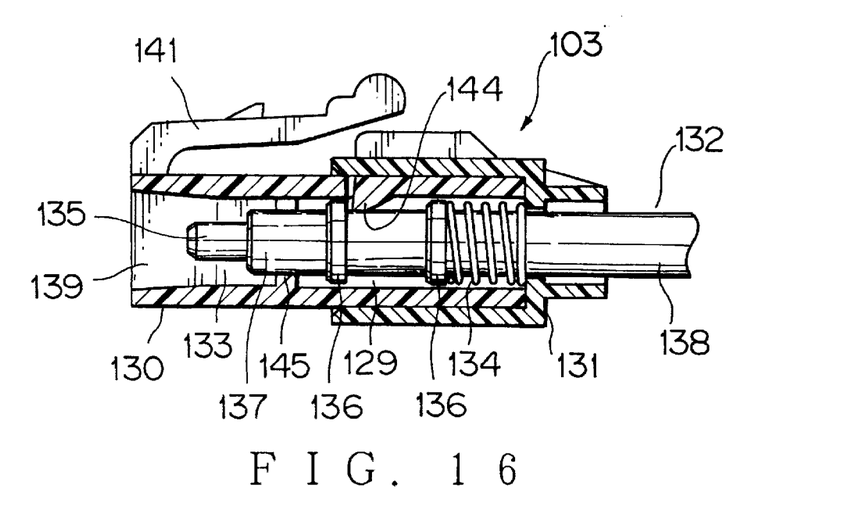
FIG. 16 is a sectional view of the conventional optical plug.
Figure 17:
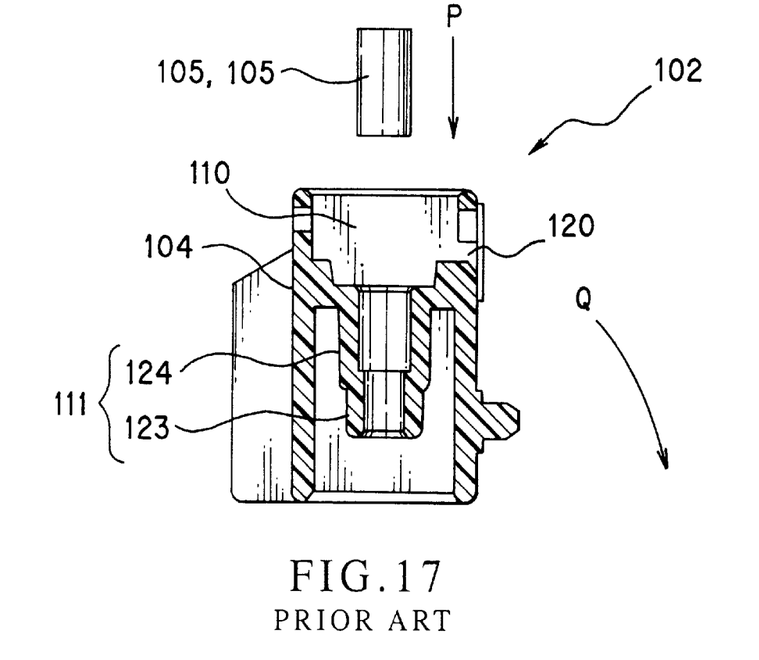
FIG. 17 is a sectional view of the conventional receptacle, explaining an assembly process thereof wherein a sleeve member is not yet fitted.

As shown in FIG. 17, the transferring tube portion 111 is formed with a step. And, a small-diameter portion 135 (FIG. 16) of a ferrule member 133 (described later) is inserted in a front small-diameter portion 123 of the transferring tube portion 111, and the sleeve member 105 (FIG. 15) is inserted in a rear large-diameter portion 124 of the transferring tube portion 111.

On the other hand, as shown in FIG. 15, the sleeve member 105 is formed cylindrically and consists of an optical waveguide portion 125 made of glass or synthetic resin and a holder portion 126. The light receiving element module 106 and the luminescence element module 107 are formed by putting a light receiving element (not shown) and a luminescence element (not shown) in respective molded portions 127,128.

In the assembly of the receptacle 102, the light receiving element and the corresponding sleeve member 105 and also the luminescence element and the corresponding sleeve member 105 are aligned on the respective longitudinal axes of the respective transferring tube portions 111.

The above optical plug 103 includes, as shown in FIG. 16, a pair of ferrule member assemblies 129, a plug housing 130 (FIGS. 14 and 16) to accommodate the ferrule assemblies 129, and a spring cap 131 (FIGS. 14 and 16) to engage a rear portion of the plug housing 130 and to hold the ferrule assemblies 129.

The ferrule assembly 129 consists of an optical fiber cable 132, a ferrule member 133 attached to the end of the optical fiber cable 132, and a spring 134.

The ferrule member 133 is formed stepwise, a core portion (not shown) of the optical fiber cable 132 is inserted in a smaller-diameter portion 135 of the ferrule member 133, and a primary sheathing (not shown) of the optical fiber cable 132 is inserted in a large-diameter portion 137 of the ferrule member 133, which large-diameter portion 137 is provided with flanges 136. A reference character 138 indicates a secondary sheathing of the optical fiber cable 132.

The spring 134 is arranged between the rear side flange 136 and the spring cap 131 and pushes the ferrule member 133 forward.

The plug housing 130 is formed substantially as a box and has accommodating chambers 139 to accommodate the ferrule assemblies 129. And, the plug housing 130 is provided with a locking arm 141 on a top wall 140 thereof. The optical plug 103 is uncoupled from the receptacle 102 by pushing an end portion of the locking arm 141 (FIG. 14).

And, the plug housing 130 is, as shown in FIG. 14, provided with slit covers 142 at the rear ends of both side walls, which slit covers 142 project rearward from the respective rear ends.

The spring cap 131 is formed substantially as a cup and is provided with plug guiding slits 143 on respective side walls. The plug guiding slits 143 are closed with the respective slit covers 142 of the plug housing 130.

Against a rear inside plane of the spring cap 131 the springs 134 (FIG. 16) abut, and inside and in the middle of the spring cap 131 an engaging projection (not shown) to engage the plug housing 130 is formed.

The optical plug 103 is assembled by engaging the spring cap 131 with the plug housing 130 after fitting the ferrule assemblies 129 (only one being shown in FIG. 16) to the optical plug 103 through the plug guiding slits 143 of the spring cap 131. The ferrule assemblies 129 are accommodated in the accommodating chambers 139 (FIG. 16) and are locked by engaging projections 144 (only one being shown in FIG. 16) of the plug housing 130, which engaging projection 144 is positioned between the pair of flanges 136 of the ferrule members 133.

As described above, the ferrule assemblies 129 are pushed forward by the springs 134 (one being shown) and the forward movement of the ferrule assemblies 129 is limited by the stoppers 145 formed in the accommodating chambers 139.

In the above structure, on coupling of the optical plug 103 with the receptacle 102 the transferring tube portions 111 enter the plug housing 130, and simultaneously the smaller-diameter portions 135 of the ferrule assemblies 129 enter the transferring tube portions 111. And, the large-diameter portions 137 of the ferrule assemblies 129 abut against the ends of the transferring tube portions 111, while keeping suitable pressure therebetween by means of the springs 134.

Figure 18:
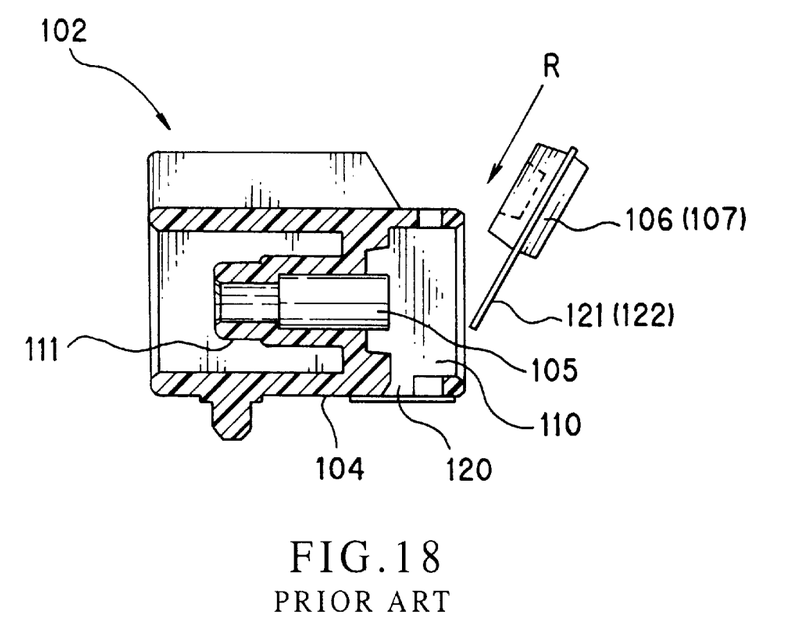
FIG. 18 is a sectional view of the conventional receptacle, explaining an assembly process thereof wherein a light receiving element module and a luminescence element module both as optical element modules are not yet fitted.

With respect to the above conventional receptacle 102 of the optical connector 101, however, since the light receiving element module 106 and the luminescence element module 107 have to be inclined as shown with the arrow R in FIG. 18 when the modules 106, 107 are fitted into the receptacle 102, that is, the fitting work of the modules 106, 107 into the accommodating chambers 110 cannot be done smoothly.

And, the terminals 121,122 are likely to hit the terminal led-out portions 120 during the above fitting work and the terminals 121,122 would bend, which should disturb the assembly process thereafter.

Further, as is shown in FIGS. 17 to 20, since reversing work of the connector housing 104 would be required for easier fitting of the modules 106,107, the productivity of the receptacle 102 would not be good.

Figure 19:
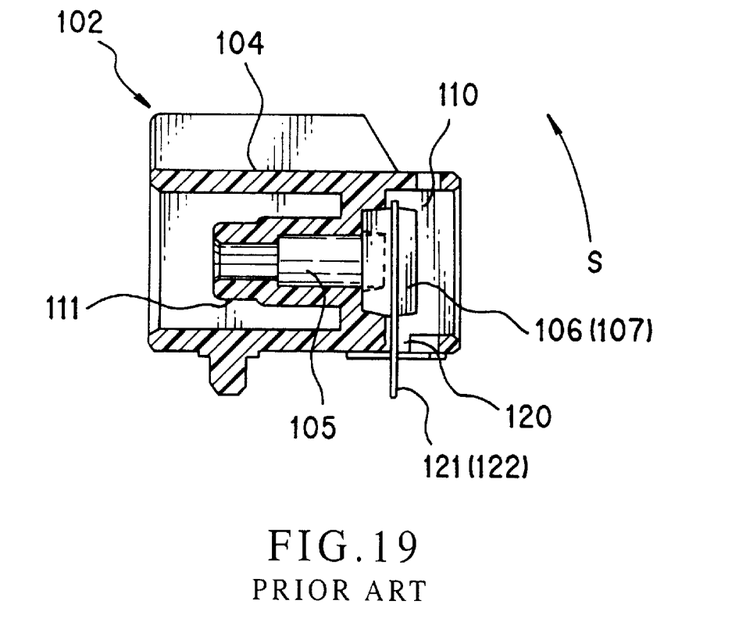
FIG. 19 is a sectional view of the conventional receptacle, explaining an assembly process thereof wherein the light receiving element module and the luminescence element module both as optical element modules have been fitted.
Figure 20:
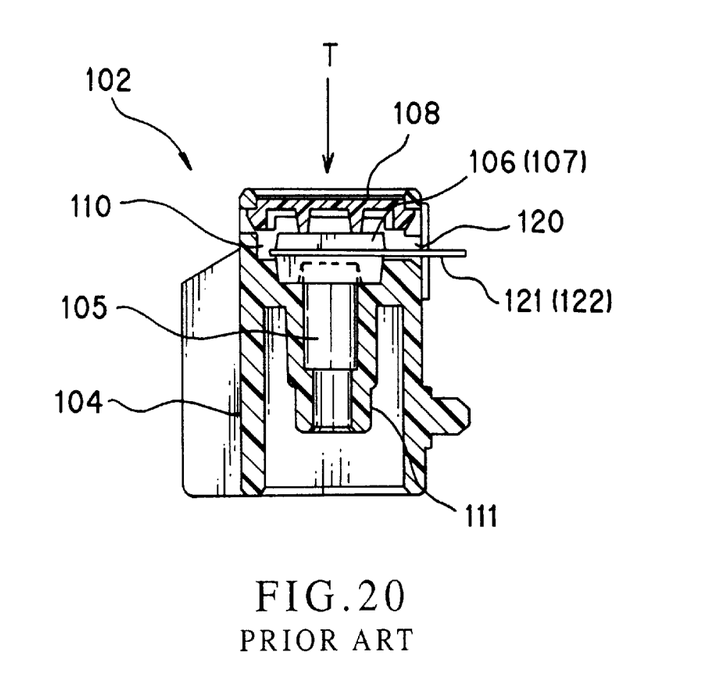
FIG. 20 is a sectional view of the conventional receptacle, explaining completion of the assembly process thereof wherein a cap member has been fitted.

Here, the assembly process of the receptacle 102, in turn, is: the sleeve members 105 are fitted to the connector housing 104 in an arrow P direction after the longitudinal axis of the connector housing 104 is arranged vertically as shown in FIG. 17; the connector housing 104 is arranged horizontally by turning it in an arrow Q direction; the light receiving element module 106 and the luminescence element module 107 are accommodated in the connector housing 104 as shown in FIG. 19 by shifting them in an arrow R direction as shown in FIG. 18; the connector housing 104 is again arranged vertically by turning it in an arrow S direction; and the cap member 108 is fitted to the connector housing 104 in an arrow T direction.

The terminal led-out portions 120 have respective rear frames. And, the rear frames require such assembly process as the above, which hinders automatic assembly of the receptacle 102 and, therefore, improvement of the productivity of the receptacle 102 should be required.

SUMMARY OF THE INVENTION

In view of the foregoing, an object of the present invention is to provide a receptacle with high productivity.

In order to achieve the above-described object, as a first aspect of the present invention, a receptacle of an optical connector in accordance with the present invention includes: a connector housing having a front and rear openings; an optical element module having an optical element and to be accommodated in the connector housing; a sleeve member to be accommodated in the connector housing for relaying light; and a cap member to be fitted to the rear opening, wherein the connector housing is provided with a coupling portion including the front opening for coupling with a mating optical plug connected to an optical fiber cable having a ferrule member, an accommodating chamber to accommodate the optical element module and having a terminal led-out portion on a bottom wall of the connector housing for leading a terminal of the optical element module outward of the connector housing, and a transferring tube portion connecting the coupling portion with the accommodating chamber and being fitted with the ferrule member on a coupling portion side thereof and with the sleeve member on an accommodating chamber side thereof, while aligning the sleeve member with the optical element on a longitudinal axis of the transferring tube portion, and further wherein the rear opening and the terminal led-out portion are continuously formed.

As a second aspect of the present invention, in the structure with the above first aspect, an engaging portion is provided on side walls of the connector housing and a securing projection to engage the engaging portion is provided on the cap member for holding the cap member.

As a third aspect of the present invention, in the structure with either one of the above first and second aspects, the cap member is provided with a projecting portion projecting inward of the terminal led-out portion and toward the terminal.

As a fourth aspect of the present invention, in the structure with any one of the above first to third aspects, the cap member is provided with a pushing projection to push the optical element module toward the sleeve member.

According to the above-described structure of the present invention, the following advantages are provided.

(1) Since the optical element module can be fitted in the accommodating chamber without inclining it as the same way as the sleeve member and as the cap member in the same direction, and since the terminal led-out portion continues from the rear opening, the optical element module can be smoothly fitted in the accommodating chamber without any obstacle. Further, since assembly work, such as turning work of the connector housing in the assembly process, can be eliminated, automatic assembly work is easily available. Thereby, a receptacle with high productivity can be realized.

(2) Though the terminal led-out portion continues from the rear opening, the cap member is secured to the connector housing since the securing projection of the cap member engages the engaging portion of the connector housing.

(3) Since the cap member is provided with the projecting portion projecting inward of the terminal led-out portion, the optical element can fully perform.

(4) Since the cap member is provided with a pushing projection to push the optical element module toward the sleeve member, the optical element module can be put into close contact with the sleeve member.

The above and other objects and features of the present invention will become more apparent from the following description taken in conjunction with the accompanying drawings.

DESCRIPTION OF THE PREFERRED EMBODIMENT

An embodiment of the present invention will now be described in further detail with reference to the accompanying drawings.

Figure 1:
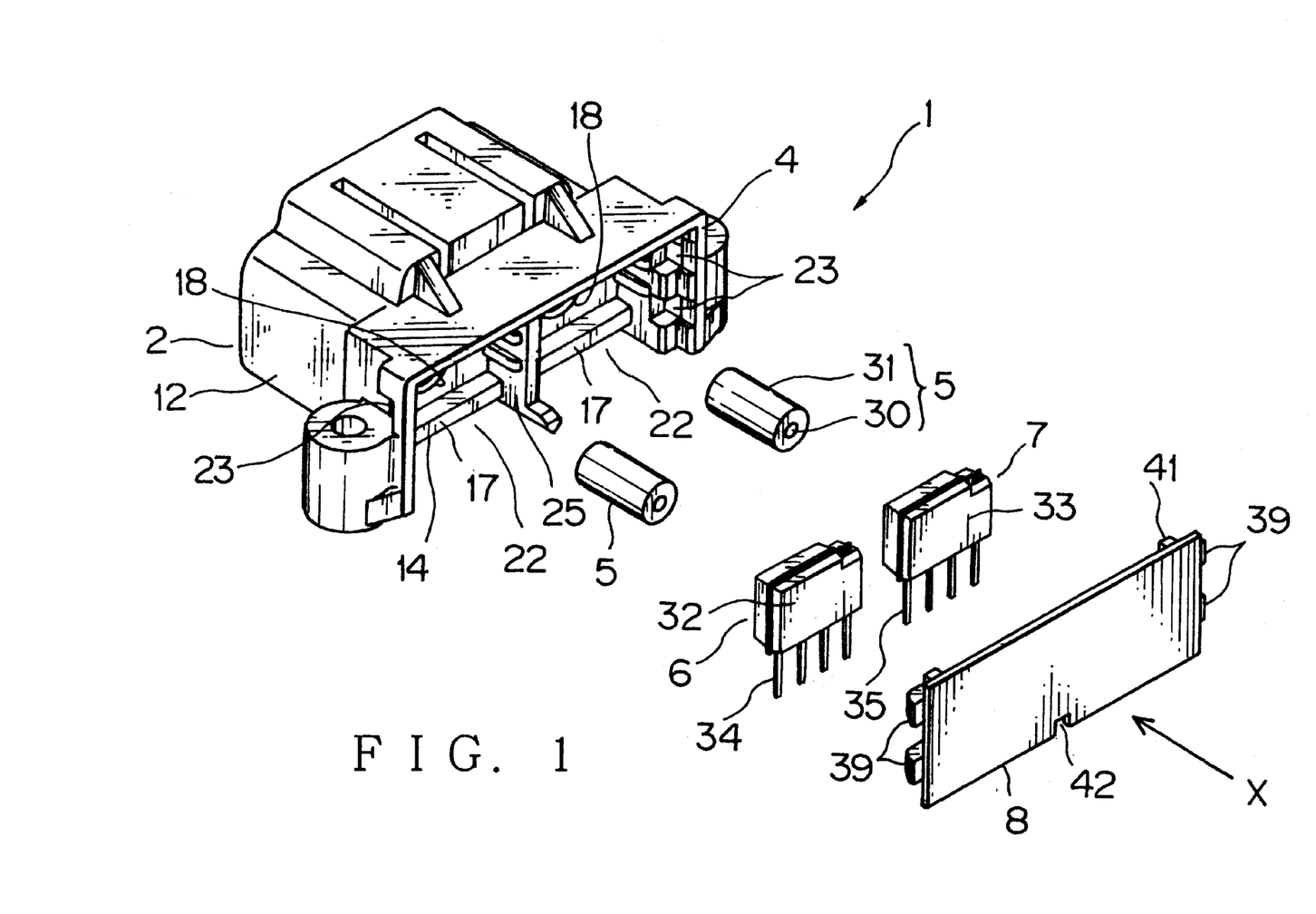
FIG. 1 is an exploded rear-perspective view showing an embodiment of a receptacle in accordance with the present invention.
Figure 2:
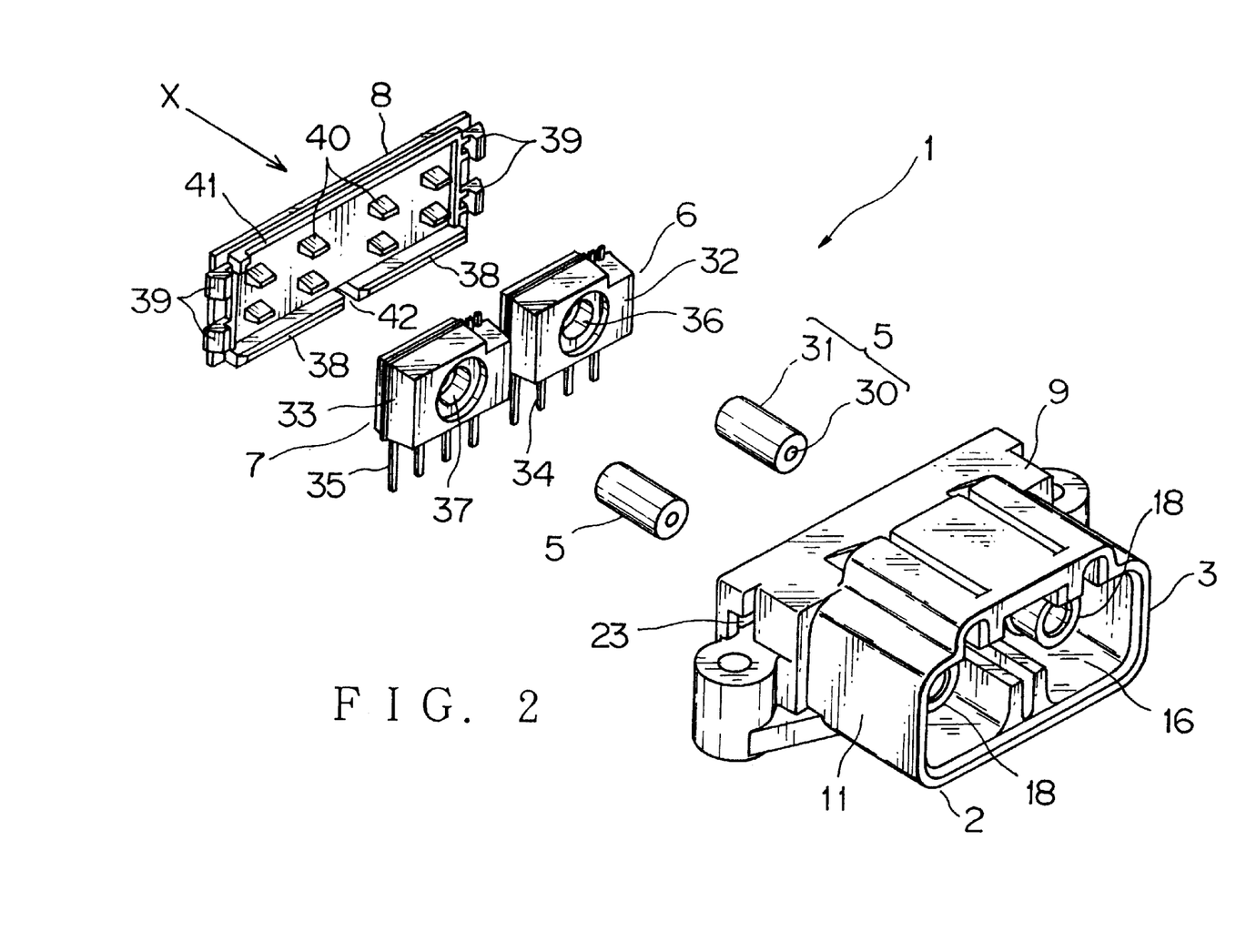
FIG. 2 is an exploded front-perspective view showing the receptacle of FIG. 1.

FIG. 1 is an exploded rear-perspective view showing an embodiment of a receptacle in accordance with the present invention, and FIG. 2 is an exploded front-perspective view showing the receptacle of FIG. 1.

Figure 3:
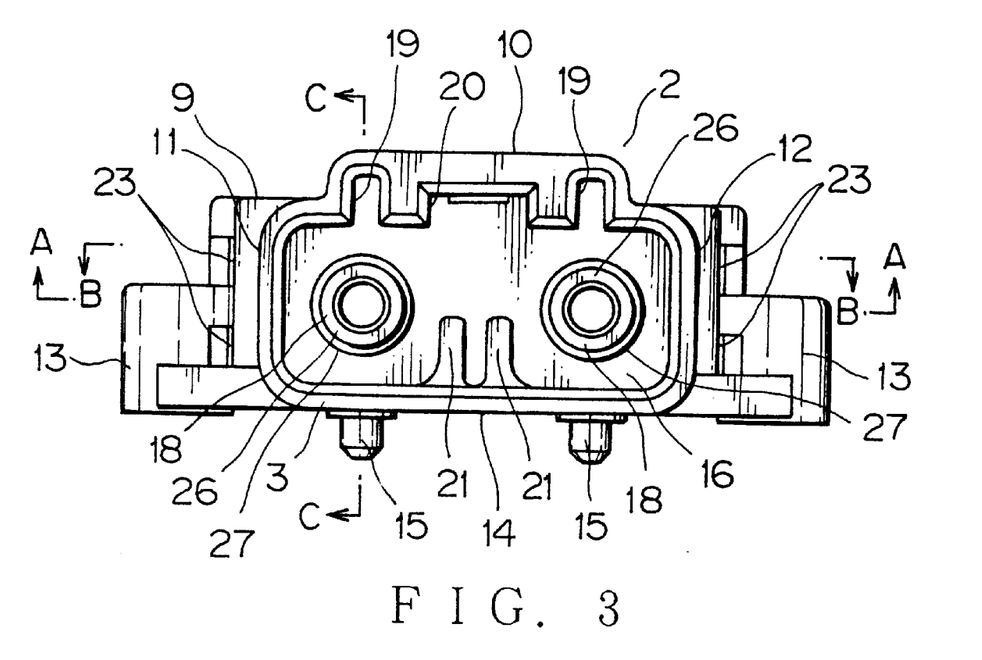
FIG. 3 is a front view of a connector housing.
Figure 4:
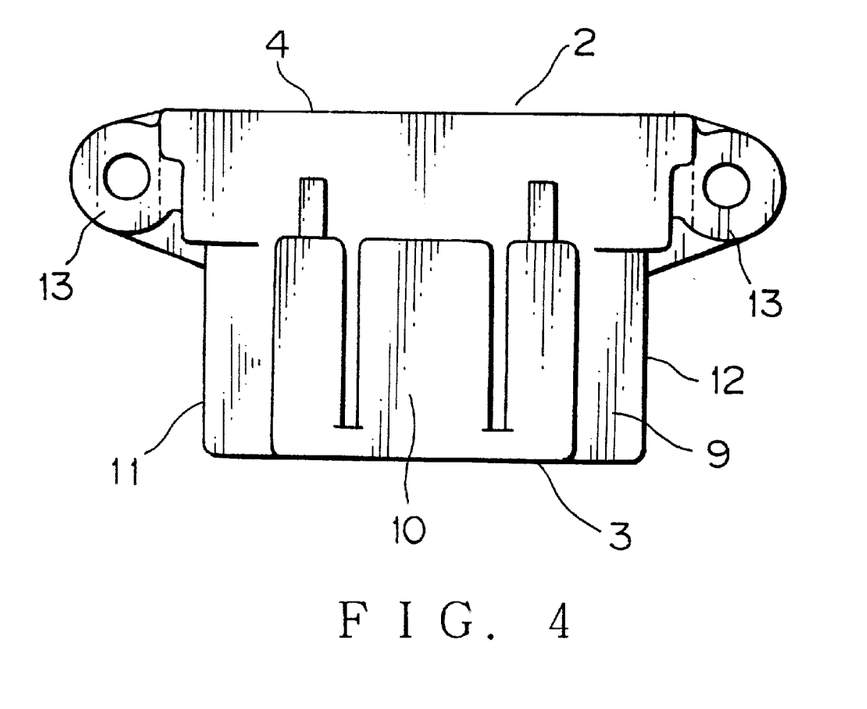
FIG. 4 is a plan view of the connector housing.
Figure 5:
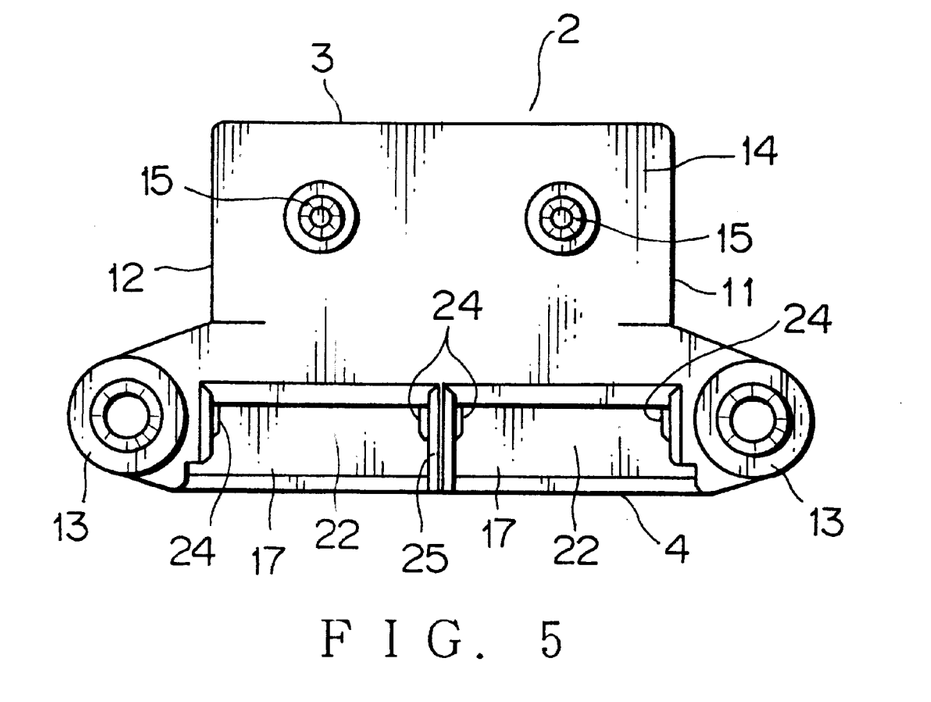
FIG. 5 is a bottom view of the connector housing.
Figure 6:
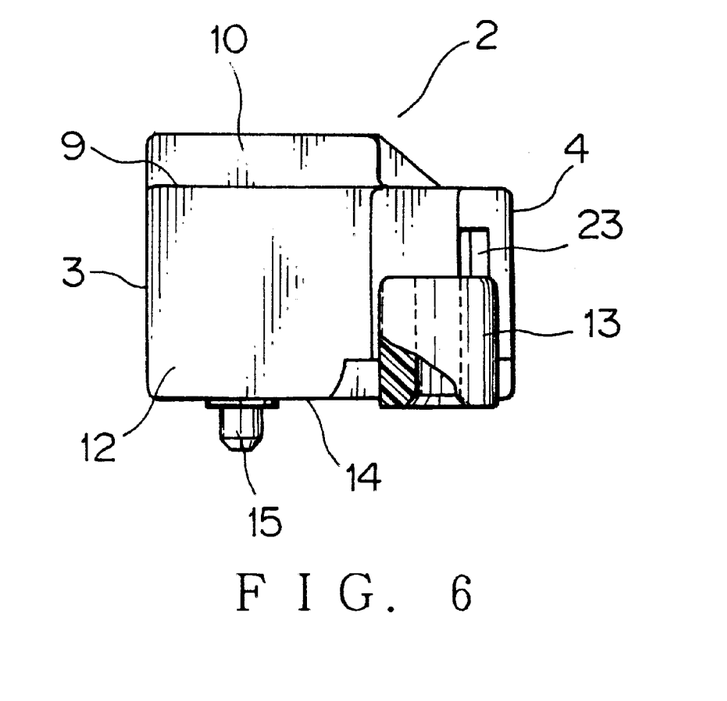
FIG. 6 is a right side view of the connector housing.
Figure 7:
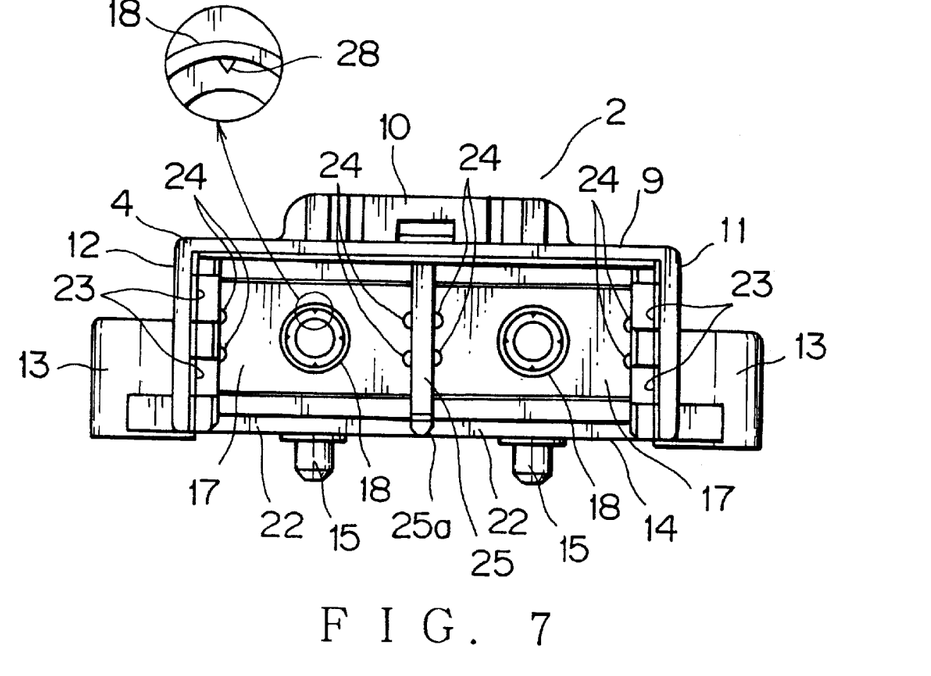
FIG. 7 is a rear view of the connector housing.
Figure 8:
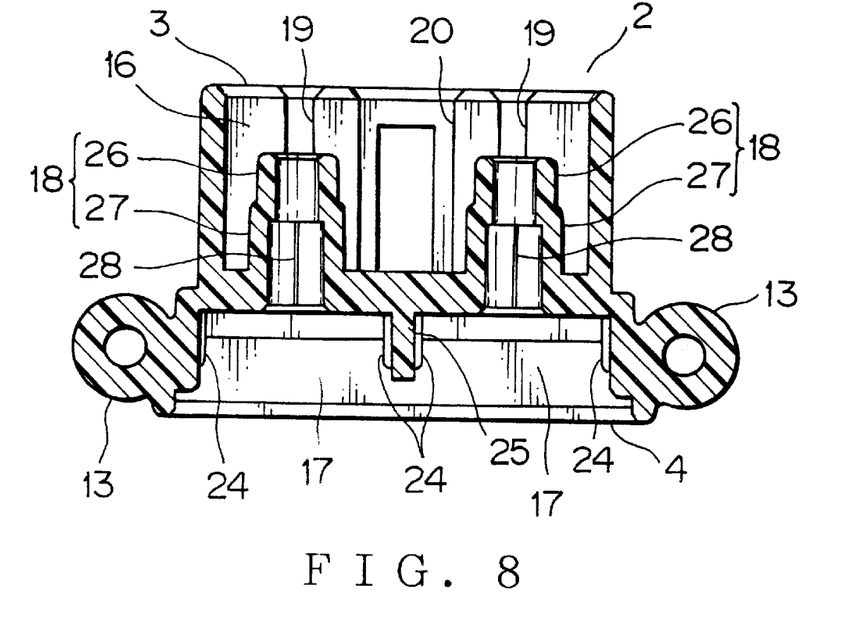
FIG. 8 is a sectional view, taken along a line A—A in FIG. 3, showing the receptacle.
Figure 9:
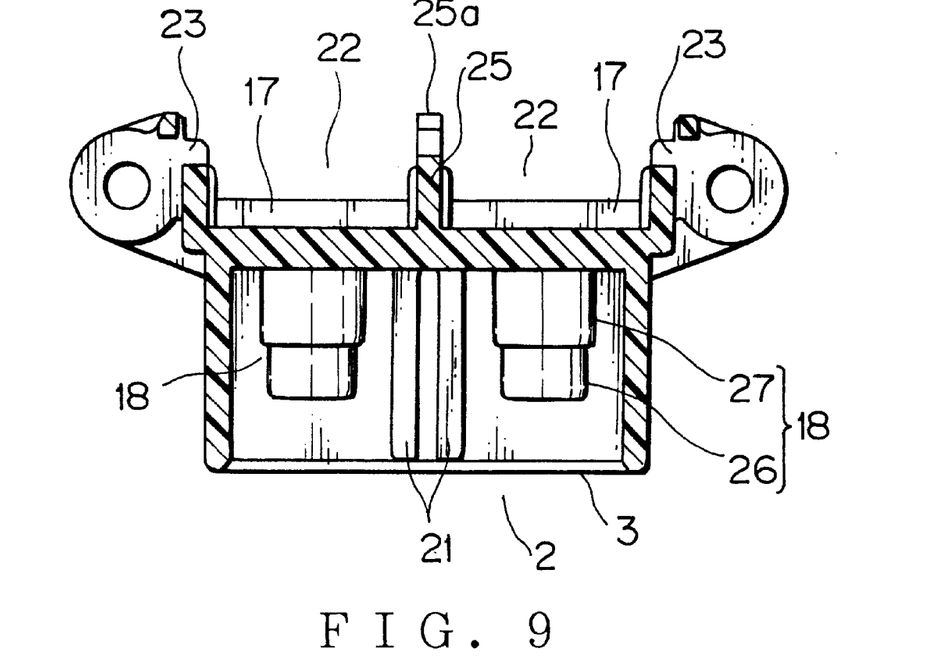
FIG. 9 is a sectional view, taken along a line B—B in FIG. 3, showing the receptacle.
Figure 10:
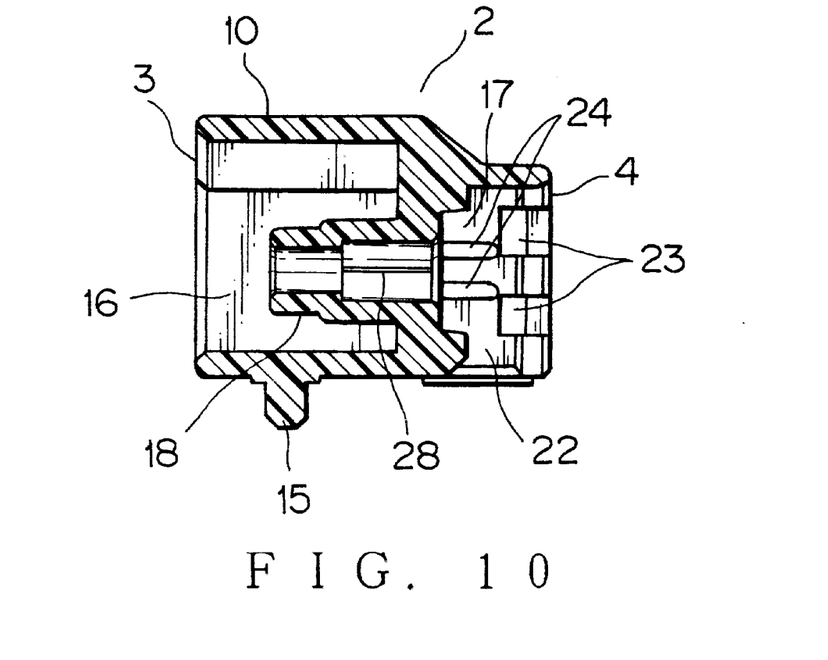
FIG. 10 is a sectional view, taken along a line C—C in FIG. 3, showing the receptacle.
Figure 11:
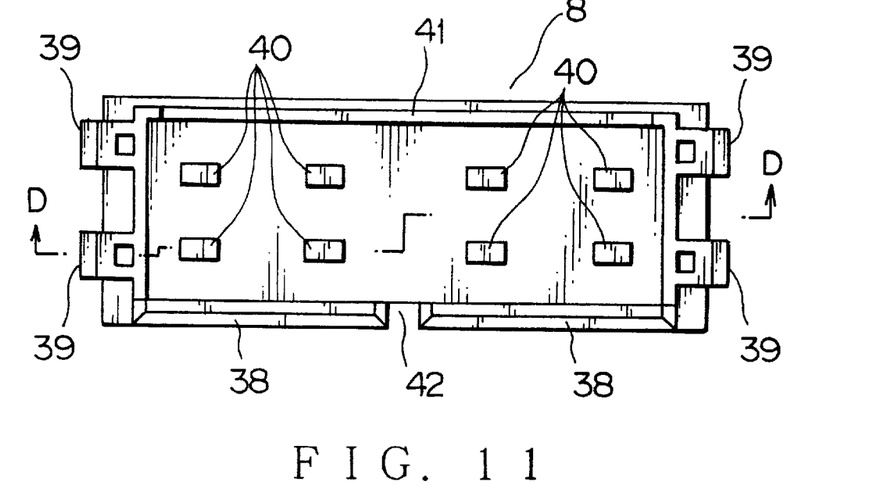
FIG. 11 is a front view of a cap member.
Figure 12:
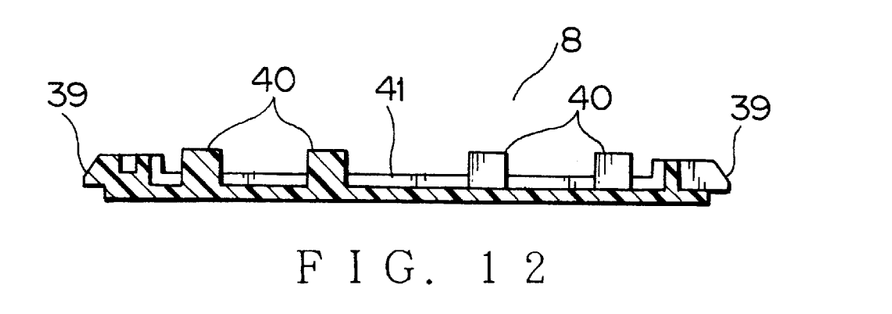
FIG. 12 is a sectional view, taken along a line D—D in FIG. 11, showing the cap member.
Figure 13:
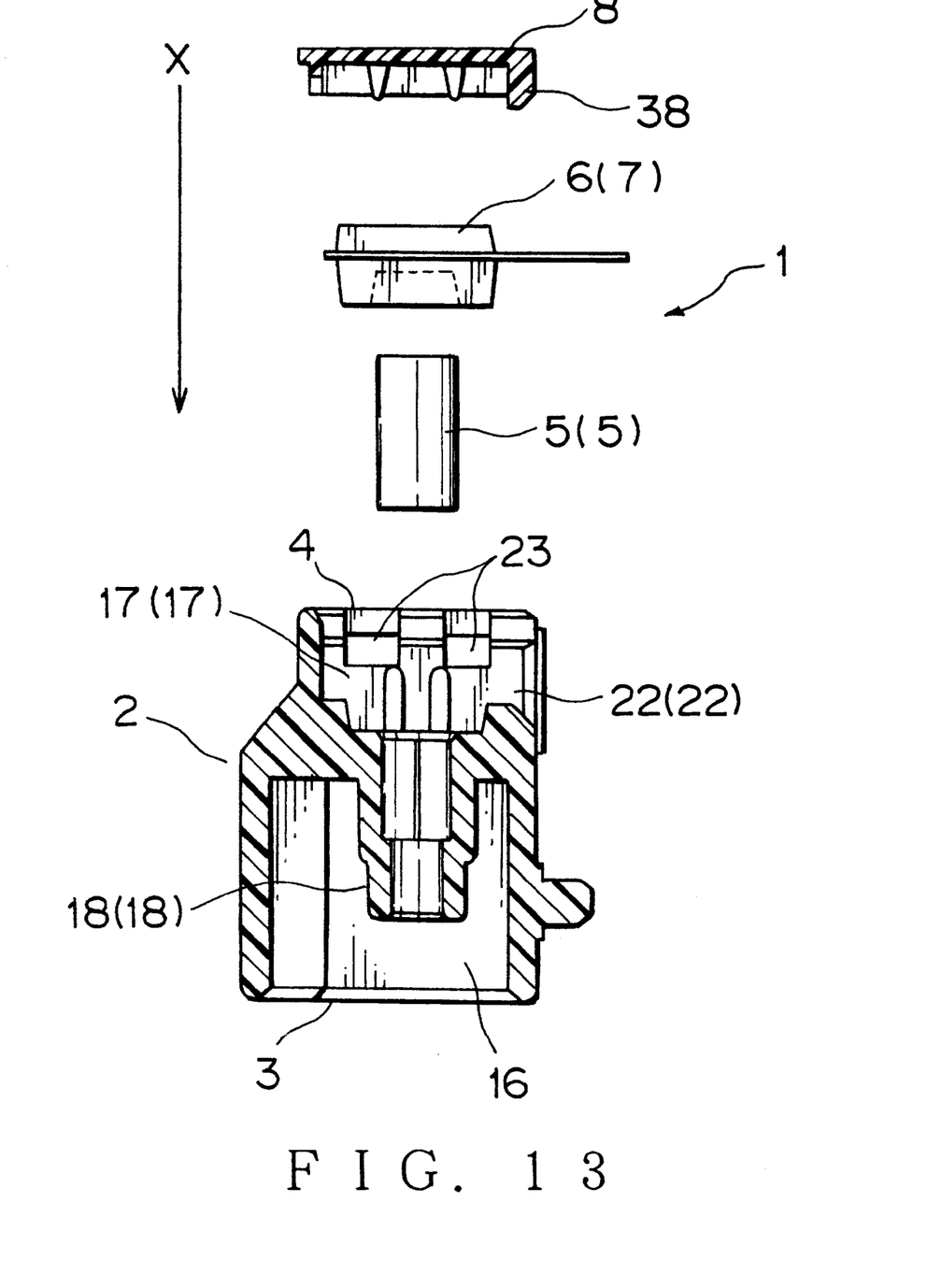
FIG. 13 is a sectional view explaining the assembly process of the receptacle.

And further, FIGS. 3–10 concern the connector housing, that is, FIG. 3 is a front view, FIG. 4 is a plan view, FIG. 5 is a bottom view, FIG. 6 is a right side view, FIG. 7 is a rear view, FIG. 8 is a sectional view taken along a line A—A in FIG. 3, FIG. 9 is a sectional view taken along a line B—B in FIG. 3, and FIG. 10 is a sectional view taken along a line C—C in FIG. 3. And, FIG. 11 is a front view of a cap member, FIG. 12 is a sectional view taken along a line D—D in FIG. 1, and FIG. 13 is a sectional view explaining the assembly process of the receptacle.

In FIG. 1, a reference character 1 indicates a receptacle of the optical connector similar to a conventional one.

The receptacle 1 has a connector housing 2 which has front and rear openings as shown in FIGS. 1 and 2. Through the front opening 3 of the connector housing 2 an optical plug (not shown) is coupled therewith, which optical plug should have basically the same structure as the conventional optical plug 103 (FIG. 14).

And, through the rear opening 4 of the connector housing 2, a sleeve member 5, a light receiving element module 6 (corresponding to an optical element module as claimed), a luminescence element module 7 (corresponding to an optical element module as claimed), and a cap member 8 in a rectangular plate-like shape are fitted in turn.

And, the sleeve member 5, the light receiving element module 6, the luminescence element module 7, and the rectangular plate-like cap member 8 are fitted into the receptacle 1 in the same direction shown with the arrow X for raising the productivity.

Hereinafter, specific structure is described. First, the connector housing 2 is described in reference to any one of FIGS. 1–10.

The connector housing 2 is made of synthetic resin including carbon and formed substantially in a box with a step portion substantially in the longitudinal middle thereof. A top wall 9 of the connector housing 2 is provided with a guide portion 10, and right and left walls 11,12 (in view from the front of the connector housing 2) are provided with respective substantially cylindrical securing portions 13. And, a bottom wall 14 is provided with fixing pins 15 projecting therefrom for mounting the receptacle 1 on another object (not shown).

Inside the connector housing 2, a coupling portion 16, having the front opening 3, to couple with an optical plug (not shown), accommodating chambers 17 to accommodate the light receiving element module 6 and the luminescence element module 7 from the rear opening 4, and transferring tube portions 18 connecting the coupling portion 16 and the accommodating chambers 17 are formed.

The guide portion 10 projects outward from a front side portion of the top wall 9, and guide grooves 19 communicating with the coupling portion 16 and an engaging groove 20 to engage the optical plug (not shown) are formed inside the guide portion 10.

The coupling portion 16 is formed in a shape capable of receiving a plug housing (not shown) of the optical plug and is provided with standing walls 21 vertically standing on the bottom wall 14 substantially in the cross-center of the coupling portion 16. And, front portions of the transferring tube portions 18 protrude into the coupling portion 16.

The accommodating chambers 17 are separated by a partition wall 25, and terminal led-out portions 22 are formed on the respective bottoms of the accommodating chambers 17. And, engaging portions 23 for the cap member 8 are formed on the right and left walls 11, 12 of the accommodating chambers 17.

A plurality of pressing projections 24 for the light receiving element module 6 and the luminescence element module 7 are formed. (In the present embodiment, a pair of pressing projections 24 are provided on each side of the partition wall 25.) And, a pair of pressing projections 24 are provided on each of the right and left walls 11, 12 on the same level as on the partition wall 25. Here, a reference character 25a indicates a guiding portion for the cap member 8.

The terminal led-out portions 22 are opened on the bottom wall 14, while connecting to the rear openings 4. That is, the terminal led-out portions 22 are formed such that the rear edges of the conventional terminal led-out portions 120 (FIG. 15) are removed.

The engaging portions 23 are formed stepwise on the right and left walls 11,12 near the rear openings 4 and can be formed at the molding of the connector housing 2. A pair of engaging portions 23 are provided on each of the right and left walls 11,12 for securing the cap member 8. The number and position of the engaging portions 23 may be changed due to arrangement of the securing portions 13.

The above transferring tube portion 18 is cylindrically formed with a step on each of the outer and inner surfaces, and a ferrule member of an optical plug (not shown) is inserted in its front small-diameter portion 26. And, the sleeve member 5 is inserted in a rear large-diameter portion 27 of the transferring tube portion 18, which rear large-diameter portion 27 is provided with four pressing projections 28 at the same intervals for pressing the sleeve member 5. The rear large-diameter portion 27 is formed with a depth that a rear portion of a sleeve member 5 inserted therein is exposed in the accommodating chamber 17.

The transferring tube portion 18 is formed such that the longitudinal axis of the ferrule member and the sleeve member 5 are substantially aligned on a longitudinal axis of the transferring tube portion 18.

The sleeve member 5 has the same structure as the conventional sleeve member 105 (FIG. 15); that is, it consists of an optical waveguide portion 30 made of glass or synthetic resin and consisting of both a core and a clad portion and having a cylindrical holder portion 31 made of metal.

Since the sleeve member 5 has such a structure, for example, an optical fiber with the same length as the sleeve member 5 is capable of substituting for the sleeve member 5. In such a case, the core portion, made of glass or synthetic resin, of the optical fiber corresponds to the optical waveguide portion 30 and a sheath, made of synthetic resin, of the optical fiber corresponds to the holder portion 31.

And, the light receiving element module 6 and the luminescence element module 7 are described, also referring to FIGS. 1 and 2.

The light receiving element module 6 and the luminescence element module 7 are formed by putting a light receiving element (not shown) and a luminescence element (not shown) (both corresponding to the optical element portion as claimed) in respective molded portions 32,33 which are molded out of a synthetic resin exhibiting almost the same transmittance as, for example, the optical waveguide portion 30 of the sleeve member 5. The molded portions 32,33 each have four terminals 34,35.

The molded portions 32,33 are provided with respective circular holes 36,37 corresponding to respective front portions of the light receiving element and the luminescence element for accommodating the sleeve members 5 projecting from the respective transferring tube portions 18 into the accommodating chambers 17. By forming the holes 36,37, when the light receiving element module 6 and the luminescence element module 7 are accommodated in the accommodating chambers 17, rear portions of the sleeve members 5 are received in the holes 36,37, the sleeve members 5 come closer to the light receiving element and the luminescence element.

Here, a photodiode (PD) and a light emitting diode (LED) may be used as the light receiving element and the luminescence element, respectively.

Further, the cap member 8 is described.

As shown in FIGS. 11 and 12, the cap member 8 is formed in a rectangular plate-like shape and is provided with a pair of projecting portions 38, four securing projections 39, eight pushing projections 40, being in vertically two lines, and a frame portion 41 all on the front side surface from which the cap member 8 is fitted to the connector housing 2 (FIGS. 1 and 2). Also, the cap member 8 is provided with a recess 42 between the pair of projecting portions 38,38.

The projecting portions 38 are formed at a bottom edge portion of the cap member 8, project inward the terminal led-out portions 22, and come close to the terminals 34,35 at an attaching process of the cap member 8. The securing projections 39, each substantially in a shape of a claw, have a pair projecting from each of the right and left end portions of the cap member 8. The securing projections 39 engage the engaging portions 23 and prevent the cap member 8 from falling off.

The pushing projections 40 project so as to push the light receiving element module 6 and the luminescence element module 7 toward the transferring tube portion 18 in the longitudinal direction thereof at the attaching process of the cap member 8. And, the guiding portion 25a of the partition wall 25 enters the recess 42 at the attaching process of the cap member 8.

The cap member 8 is made of the same material as the connector housing 2 in the present embodiment.

Next, the assembly process of the receptacle 1 is described, referring to FIG. 13. For example, after vertically arranging the connector housing 2, that is, the longitudinal axis of the transferring tube portion 18 becomes vertical, the sleeve members 5, the light receiving element module 6, the luminescence element module 7, and the cap member 8 are fitted in turn to the connector housing 2 in the arrow X direction, improving the productivity compared with the conventional process.

That is, since the light receiving element module 6 and the luminescence element module 7 can be fitted in the accommodating chambers 17 without inclining them as the same way as the sleeve members 5 and as the cap member 8 in the same direction (i.e. in the arrow X direction), the productivity can be raised.

And, since the terminal led-out portions 22 continue from the rear opening 4, the light receiving element module 6 and the luminescence element module 7 can be smoothly fitted in the accommodating chambers 17 without any obstacle, thereby raising the productivity.

Further, since assembly work such as the above turning work in the assembly process can be eliminated, automatic assembly work is easily available, thereby raising the productivity.

Though the terminal led-out portions 22 continue from the rear opening 4, the cap member 8 is secured to the connector housing 2, since the securing projections 39 of the cap member 8 engage the engaging portions 23.

Besides, since the cap member 8 is provided with the projecting portions 38 projecting inward the respective terminal led-out portions 22, the light receiving element and the luminescence element of the light receiving element module 6 and the luminescence element module 7, respectively, can fully perform.

The present invention can be variously changed and modified by those skilled in the art within the scope of the present invention, which should be construed as being included therein.

For example, though a receptacle for a two-core optical connector has been described hereinabove, the present invention can be applied to a receptacle for a one-core two-way optical connector.

What is claimed is:

1. A receptacle of an optical connector, comprising:
  a connector housing having a front and rear openings, the rear opening being perpendicular to a longitudinal axis of the connector housing;
  an optical element module having an optical element accommodated in the connector housing;
  a sleeve member accommodated in the connector housing for relaying light; and
  a cap member fitted to the rear opening,
  wherein the connector housing is provided with a coupling portion including the front opening coupling with a mating optical plug connected to an optical fiber cable having a ferrule member, an accommodating chamber partitioned by a partition wall to accommodate the optical element module and having a terminal led-out portion parallel to said longitudinal axis on a bottom wall of the connector housing for leading a terminal of the optical element module outward of the connector housing, and a transferring tube portion connecting the coupling portion with the accommodating chamber and being fitted with the ferrule member on a coupling portion side thereof and with the sleeve member on an accommodating chamber side thereof, while aligning the sleeve member with the optical element on a longitudinal axis of the transferring tube portion, wherein said bottom wall of said connector housing terminates in said accommodating chambers and the terminal led-out portion extends continuously and unobstructedly to the exterior of said rear opening; and a guiding portion extending from a bottom of the partition wall in parallel with the longitudinal axis of the connector housing to engage a recess of the cap member for attaching said cap member to said connector housing.

2. The receptacle according to claim 1, wherein an engaging portion is provided on side walls of the connector housing and a securing projection to engage the engaging portion is provided on the cap member for holding the cap member.

3. The receptacle according to claim 1, wherein the cap member is provided with a projecting portion projecting inward of the terminal led-out portion and toward the terminal.

4. The receptacle according to claim 2, wherein the cap member is provided with a projecting portion projecting inward of the terminal led-out portion and toward the terminal.

5. The receptacle according to claim 1, wherein the cap member is provided with a pushing projection to push the optical element module toward the sleeve member.

6. The receptacle according to claim 2, wherein the cap member is provided with a pushing projection to push the optical element module toward the sleeve member.

7. The receptacle according to claim 3, wherein the cap member is provided with a pushing projection to push the optical element module toward the sleeve member.

8. The receptacle according to claim 4, wherein the cap member is provided with a pushing projection to push the optical element module toward the sleeve member.

* * * * *